United States Patent [19]

Ando

[11] Patent Number: 5,379,127
[45] Date of Patent: Jan. 3, 1995

[54] IMAGE RECORDING APPARATUS AND IMAGE RECORDING RETRIEVING APPARATUS

[75] Inventor: Takeshi Ando, Tokyo, Japan

[73] Assignee: Kabushiki Kaisha Toshiba, Kawasaki, Japan

[21] Appl. No.: 33,355

[22] Filed: Mar. 18, 1993

[30] Foreign Application Priority Data

Mar. 23, 1992 [JP] Japan .................. 4-064982

[51] Int. Cl.6 .............. H04N 1/00; H04N 1/40; G03G 21/00; G06K 9/32
[52] U.S. Cl. .................... 358/448; 358/403; 358/449; 358/468; 355/311; 382/46
[58] Field of Search .............. 358/403, 488, 448, 449, 358/451, 452, 468; 382/46, 18; 355/311

[56] References Cited

U.S. PATENT DOCUMENTS

| | | | |
|---|---|---|---|
| 4,445,195 | 4/1984 | Yamamoto | 364/900 |
| 4,899,227 | 2/1990 | Yamada | 358/452 |
| 5,038,218 | 8/1991 | Matsumoto | 358/296 |
| 5,093,653 | 3/1992 | Ikehira | 340/727 |
| 5,220,431 | 6/1993 | Yamagucci | 358/296 |
| 5,241,626 | 8/1993 | Taoda | 395/166 |

Primary Examiner—Edward L. Coles, Sr.
Assistant Examiner—Allan A. Esposo
Attorney, Agent, or Firm—Cushman, Darby & Cushman

[57] ABSTRACT

A device for recording and retrieving images corresponding to a plurality of documents is based on an apparatus which generates images which respectively correspond to a plurality of original documents, rotates those images to provide a more meaningful image for the user, and records those images on a recording medium. The image corresponding to each document which is scanned subsequent to the first document is rotated based on whether the image corresponding to the first document is rotated or not. A comparison between a pixel count on the image corresponding to the first document may be compared with a pixel count corresponding to each subsequently generated image to determine whether such rotation should be performed. Original documents are scanned in the sub-scanning direction and rotated after scanning to increase scanning speed. Retrieval data for each image is stored for retrieval purposes.

5 Claims, 10 Drawing Sheets

| RETRIEVAL DATA | DOCUMENT NO. |
|---|---|
|  | 1 |
|  | 2 |
|  | 3 |
|  | 4 |

26a

| DOCUMENT NO. | PAGE NO. | RECORD NO. |
|---|---|---|
| 1 | 1 | 1 |
| 1 | 2 | 2 |
| 1 | 3 | 3 |
| 2 | 1 | 4 |

26b

|  | STORING ADDRESS | LENGTH OF IMAGE | SIZE OF IMAGE | ATTRIBUTE OF IMAGE |
|---|---|---|---|---|
| RECORD 1 |  |  |  |  |
| RECORD 2 |  |  |  |  |
| RECORD 3 |  |  |  |  |
|  |  |  |  |  |

IMAGE RECORDING APPARATUS AND IMAGE RECORDING RETRIEVING APPARATUS

BACKGROUND OF THE INVENTION

1. Field of the Invention

The present invention relates to an image recording apparatus and an image storing-retrieving apparatus, such as an image filing apparatus.

2. Description of the Related Art

In recent years, an image filing apparatus has been put to practical use. The image filing apparatus comprises a scanner (a two-dimensional scanner), an optical disk drive, a magnetic disk drive, and an output device such as a CRT display or a recording device. The scanner reads an image from a page of a document. The optical disk drive stores the data read by the scanner on an optical disk. The magnetic disk drive stores retrieval data generated for the image data on a magnetic disk. The retrieval data includes a retrieval code based on the image and address data representing the address at which the data is stored on the optical disk. The output device presents the image represented by the data retrieved from the optical disk in accordance with the retrieval data recorded on the magnetic disk.

The scanner is connected to an automatic document feeder (ADF). A number of original sheets are set in the feeder. The feeder feeds original sheets, one after another, to the scanner. The scanner scans each sheet, reading the image formed on the sheet and generating the data representing the image. The data representing the image is stored on the optical disk.

The original sheets are set in the feeder—all in the same position, extending in the sub-scanning direction of the scanner. Since the scanner requires more time to scan a sheet extending in the sub-scanning direction than to scan a sheet extending in the main-scanning direction, it take a long time to register image data on the optical disk.

The images formed on original sheets (e.g., A4-size sheets) which may be scanned are classified into two types. The first type is clearly understood when viewed while the sheet is placed extending vertically. The second type is explicitly understood when looked while the sheet is placed horizontally. An example of a first-type image is a word-processed printed document sheet (generally known as "portrait image"). An example of a second-type image is a CAD-prepared drawing (generally called "landscape image").

A type of an image filing apparatus is known, in which each original sheet is scanned while placed extending in either the main-scanning direction or sub-scanning direction of the scanner. Another type of an image filing apparatus is known, in which the image read from any original sheet can be rotated on a display screen so as to be understood more clearly.

In the apparatus of either type described in the preceding paragraph, each data item stored on the optical disk has been read from a sheet which remains extending in the sub-scanning direction of the scanner. The data showing the position of the sheet is an retrieval data item. In order to retrieve an image in a format which can be clearly understood when looked at while the sheet bearing that image is positioned horizontally, an operator inputs an image-rotating instruction so that the image reproduced from the optical disk may be rotated. Alternatively, for the same purpose, the image reproduced from the optical disk is rotated in accordance with the data showing the position of the original sheet. To rotate the image in either method takes much time for processing the data reproduced from the optical disk which represents the image.

As may be understood from the above, the conventional image filing apparatus is not designed for displaying so that image data from an optical disk in positions which render them more clearly understood by an operator. For the operator, it is therefore necessary to input an image-rotating instruction to rotate the image retrieved from the optical disk. Consequently, much time is required to perform the image-retrieving process.

SUMMARY OF THE INVENTION

An object of the present invention is to provide an image recording apparatus which can read images from original sheets within a short time and can register the images within scanned original images within a short time.

Another object of the invention is to provide an image storing-retrieving apparatus which can retrieve any data item from an optical disk in such a form as to be understood clearly, even if displayed without being processed to represent a rotated image, and which can therefore accomplish an image-retrieving process quickly.

In a first embodiment of the invention, there is provided an image recording apparatus comprising:

original-feeding means for feeding original sheets having images one by one;

original-reading means for scanning each original sheet fed by said original-feeding means, in a main-scanning direction and a sub-scanning direction to read an image from the original sheet;

display means for displaying the image said original-reading means has read from the first original sheet;

instruction means for instructing that an image displayed by said display means be rotated;

image-rotating means for rotating the image read from the first original sheet, in response to the instruction generated by said instruction means;

image-recording means for recording the image said image-rotating means has rotated on a recording medium; and image-processing means for causing said image-rotating means to rotate an image said image-means has read from any original sheet following the first original sheet, causing said display means to display the image, and causing said image-recording means to record the image on said recording medium.

In a second aspect of the invention, there is provided an image recording apparatus comprising:

original-feeding means for feeding original sheets having images one by one;

original-reading means for scanning each original sheet fed by said original-feeding means, in a main-scanning direction and a sub-scanning direction to read an image from the original sheet;

display means for displaying the image said original-reading means has read from the first original sheet;

instruction means for instructing that an image displayed by said display means be rotated;

image-rotating means for rotating the image read from the first original sheet, in response to the instruction generated by said instruction means;

image-recording means for recording the image said image-rotating means has rotated on a recording medium;

first decision-making means for determining whether the image read from the first original sheet has been rotated, every time said original-reading means reads an original sheet following the first original sheet;

second decision-making means for determining whether to rotate the image read from any original sheet following the first original sheet, from the number of pixels arranged in the main-scanning direction and the number of pixels arranged in the sub-scanning direction, when said first decision-making means determines that the image read from the first original sheet has been rotated; and image-processing means for causing said image-rotating means to rotate the image said image-means has read from any original sheet following the first original sheet and causing said image-recording means to record the image on said recording medium.

In a third aspect of this invention, there is provided an image recording apparatus comprising:

original-reading means for scanning an original sheet having images in a main-scanning direction and a sub-scanning direction to read an image from the original sheet;

image-data supplying means for supplying data representing the image read by said original-reading means when the number of pixels arranged in the main-scanning direction is not equal to the number of pixels arranged in the sub-scanning direction;

first instruction means for instructing that image-data supplying means be rotated;

image-rotating means for rotating the image represented by the data supplied by said image-data supplying means in response to the instruction generated by said first instruction means;

data-compressing means for compressing one of two data item, the first of which is data representing the image rotated by said image-rotating means and the second of which is the data supplied by said image-data supplying means;

data-recording means for recording on a recording medium the data compressed by said data-compressing means, retrieval data associated with the data, the number of pixels arranged in the main-scanning direction and represented by the data, and the number of pixels arranged in the sub-scanning direction which is represented by the data;

data-designating means for designating the retrieval data; and image-processing means for reading from the optical disk the compressed data associated with the retrieval data designated by said data-designating means, the number of pixels arranged in the main-scanning, and the number of pixels arranged in the sub-scanning direction, and for expanding the compressed data into the original data in accordance with the number of pixels arranged in the main-scanning and the number of pixels arranged in the sub-scanning direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in, and constitute a part of, the specification, illustrate presently preferred embodiments of the invention. Together with the general description given above, and the detailed description of the preferred embodiments given below, these drawings serve to explain the principles of the invention.

DETAILED DESCRIPTION OF THE PREFERRED EMBODIMENTS

An embodiment of the invention will be described, with reference to the accompanying drawings.

Figure 1:
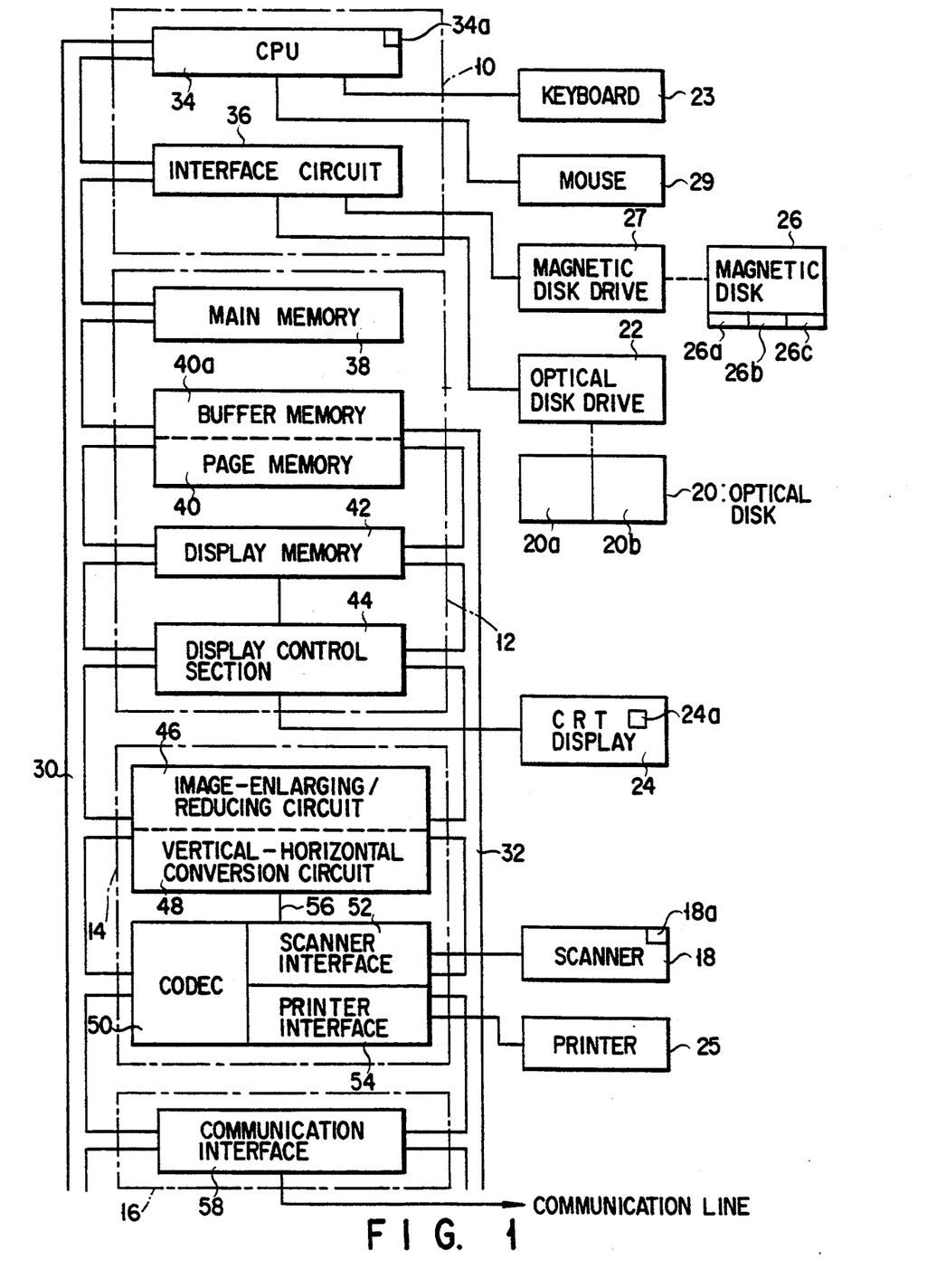
FIG. 1 is a block diagram showing an electronic filing apparatus which is an embodiment of the present invention.

FIG. 1 shows an electronic filing apparatus such as an image recording apparatus or an image storing-retrieving apparatus, which is a first embodiment of the present invention. The electronic filing apparatus comprises a control module 10, a memory module 12, an image-processing module 14, a communication control module 16, a scanner 18, an optical disk drive 22, a keyboard 23, a CRT display 24, a printer 25, a magnetic disk drive 27, a mouse 29, a system bus 30, and an image bus 32.

The control module 10 comprises a CPU 34 and an interface circuit 36. The CPU 34 is used to control various operations such as storing, retrieving, and editing of image data. The interface circuit 36 connects the CPU 34 to the magnetic disk drive 27 and the optical disk drive 22. The keyboard 23 and the mouse 29 are connected to the CPU 34.

The CPU 34 has an internal memory 34a. The internal memory 34a stores a image-rotating flag indicating whether or not to rotate the image read by the scanner 18. When the flag is on, it indicates that the image should be rotated. The image-rotating flag may be stored in the main memory 38 which will be described later.

The memory module 12 comprises the main memory 38, a page memory 40, a display memory 42, and a display control section 44.

The main memory 38 is provided for storing various control programs such as an image-storing control program, an image-retrieving control program, and an image-editing control program.

The page memory 40 functions as an image memory and has a capacity of storing several A4-size pages of image data. Part of the page memory 40 is a buffer memory area 40a. The memory 40 is used to temporarily store the image data read by the scanner 18, the image data to be stored recorded on an optical disk 20, the image data read from the optical disk 20, or the image data to be printed by the printer 25.

The display memory 42 is used as display interface to temporarily store the image data which the CRT display 24 will display. More precisely, the memory 42 stores the image data which will be displayed in a window on the screen of the CRT display 24. The image data stored in the display memory 42 may be the data read from the page memory 40; alternatively, it may be the data which has been obtained by processing the image data stored in the buffer memory 40a and which represents an enlarged image, a reduced image, a rotated image, an inserted image, or a reversed image.

The display control section 44 is connected to the CRT display 24 for controlling this display 24.

The image-processing module 14 comprises an image-enlarging/reducing circuit 46, a vertical-horizontal conversion circuit 48, a compression-expansion circuit (CODEC) 50, a scanner interface 52, a printer interface 54, and an internal bus 56. The circuit 46 processes the input image data into data which represents either an enlarged image or a reduced image. The circuit 48 processes the input image data into data which represents an identical image which is rotated by 90°. The circuit 50 performs MH (Modified Huffman) method or MR (Modified Read) method, compressing the input image data thereby to reduce redundancy, or expanding the data thereby to restore the redundancy. The scanner interface 52 connects the scanner 18 to the circuit 50, and the printer interface 54 connects the printer 25 to the circuit 50. The internal bus 56 connects the image-enlarging/reducing circuit 46, the vertical-horizontal conversion circuit 48, the compression-expansion circuit 50, the scanner interface 52, and the printer interface 54 together.

The communication control module 16 comprises a communication interface 58 such as a BCP (Bus Communication Process), which is connected to a LAN. The module 16 may include a UCP (Universal Communication Processor) connected by an interface to an external device such as a personal computer.

The system bus 30 connects the control module 10 to the memory module 12, the image-processing module 14, and the communication control module 16, for supplying control signals from the module 10 to the modules 12, 14, and 16. The image bus 32 connects the memory module 12 to the image-processing module 14 and the communication control module 16, for supplying image data from the memory module 12 to the modules 14 and 16.

The scanner 18 is, for example, a two-dimensional scanning device. It is designed to apply a laser beam onto an original (a document), thus performing two-dimensional scanning of the the original and thereby generating electric signals representing the image formed on the original. The scanner 18 has a scanning table (not shown) and an automatic document feeder 18a. The feeder 18a feeds a number of original sheets, one after another, to the scanning table. Hence, the scanner 18 can read the originals one at a time. The original sheets are fed onto the table so that each is placed thereon, extending in vertical or horizontal direction. An operator operates the mouse 29 or the keyboard, designating the vertical or horizontal position which the image read by the scanner 18 should take to be understood well by the viewer. The scanner 18 is a CCD line sensor or the like. It is moved in a main-scanning direction and a sub-scanning direction which are, respectively, perpendicular and parallel to the direction in which the original is fed onto the scanning table, to read that image formed on the original.

The optical disk drive 22 is designed to record the image data items read by the scanner 18, one after another, on the optical disk 20 set in the drive 22. It is used to retrieve any desired image data item from the optical disk 20 in accordance with the retrieval code input by operating the keyboard 23 identifying the desired image data item.

Figure 2:
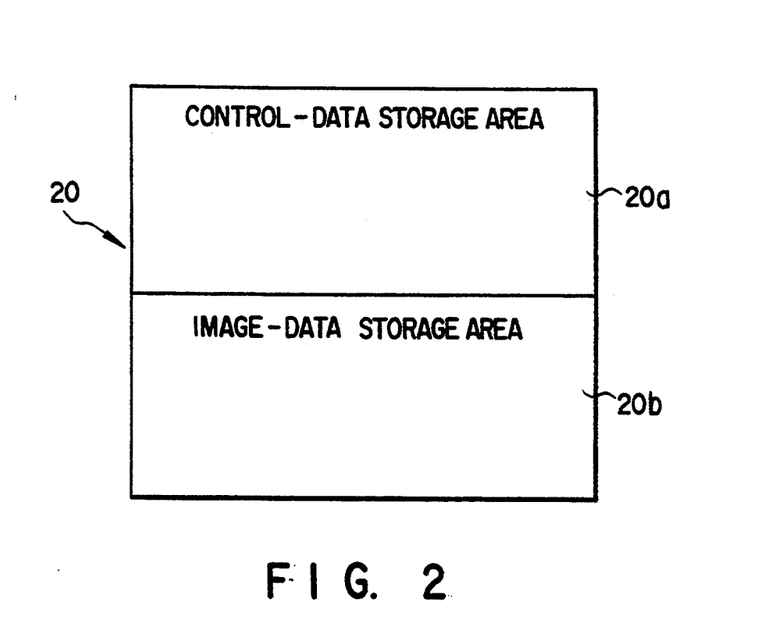
FIG. 2 is a schematic representation of the storage configuration of the optical disk used in the filing apparatus of FIG. 1.
Figure 3:
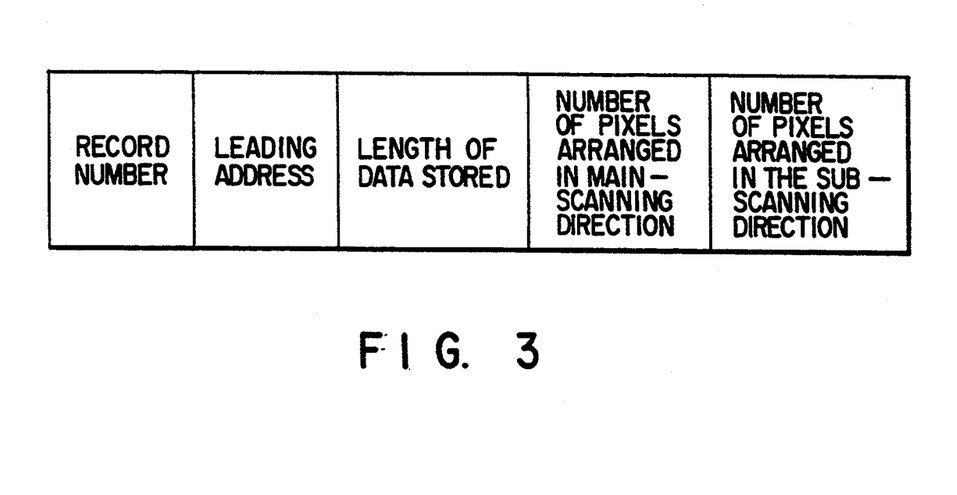
FIG. 3 is a diagram illustrating the control data which is stored in the control-data storage area shown in FIG. 2.

As schematically illustrated in FIG. 2, the optical disk 20 has a control-data storage area 20a and an image-data storage area 20b. Stored in the area 20b are 1-page data items, and stored in the area 20a are control data items for the 1-page data items stored in the area 20b. As shown in FIG. 3, each of the control data items consist of the record number identifying the 1-page data item, the start address at which the 1-page data item is stored, the length of the 1-page data item, the number of pixels arranged in the main-scanning direction, and the number of pixels arranged in the sub-scanning direction.

The keyboard 23 is operated to input a retrieval code identifying a 1-page data item to be recorded on the optical disk 20 and various instructions such as an image-storing instruction, an image-retrieving instruction, and an image-editing instruction.

The mouse 29 has a push button. The operator moves the mouse 29 in any direction desired, thereby moving a cursor in the corresponding direction on the screen of the CRT display 24. When the cursor moves to any desired position on the screen, the operator pushes the button, thus selecting the operating mode which is displayed at that position, selecting that part of the image displayed which is to be edited, or selecting an icon which is displayed at that position.

The CRT (Cathode-Ray Tube) display 24 is used to display the image represented by the data which the scanner 18 has read from the original, or the image represented by the data which the optical disk drive 22 has retrieved from the optical disk 20. The CRT display 24 is used also to display icons at the upper edge, lower edge and the right edge of its screen.

The printer 25 is provided for printing on a sheet of paper the image read by the scanner, the image retrieved from the optical disk 20, or the image being displayed by the CRT display 24, on a sheet of paper, thus forming a card copy of the image.

The magnetic disk drive 27 is designed to store a variety of control programs on the magnetic disk 26 loaded within it. It is designed also to store the retrieval code input by operating the keyboard 23, and the retrieval data corresponding to the retrieval code input. The retrieval data consists of that address in the disk 26 at which to store the image data identified by the retrieval code, the length of the image data, the size of the image represented by the image data, the attributes of the image, and the like.

Figure 4:
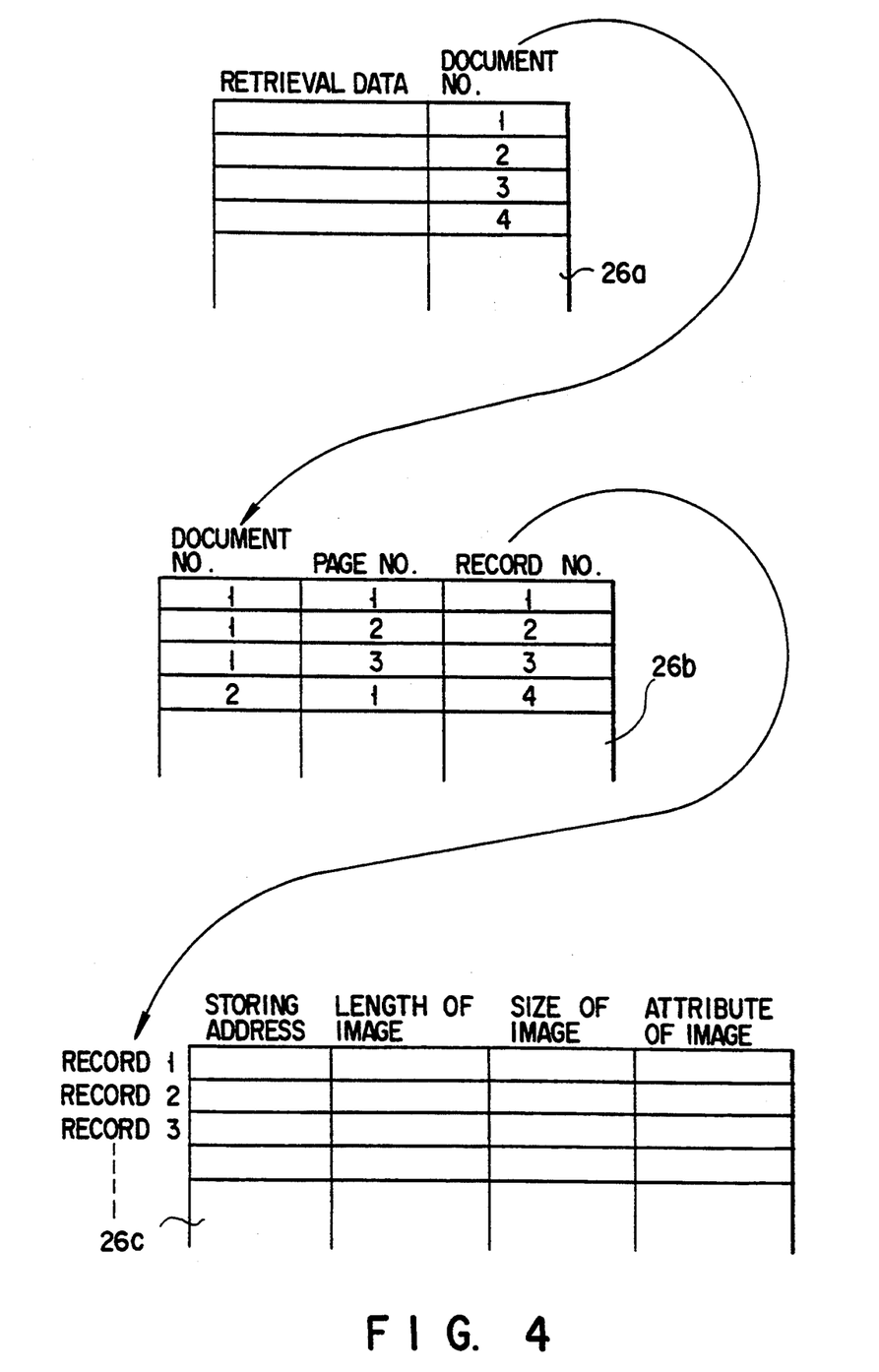
FIG. 4 is a diagram showing an example of a document control table which may be recorded in the optical disk.

The retrieval data is controlled in accordance with a document control table. As shown in FIG. 4, the document control table comprises a title control table 26a, a page control table 26b, and a record control table 26c. The title control table 26a stores the document numbers identifying the retrieval codes (i.e., image codes), each consisting of a plurality of retrieval keys. The page control table 26b stores the record numbers identifying the pages of any document recorded. The record control table 26c stores the leading one of the addresses at which the page identified by any record number is stored in the image-data storage area 20a, the length of the image (i.e., number of blocks), the size of the page, and the attribute of the image (e.g., the compression method, the resolution, and the like).

The leading address is a logical one, from which the corresponding physical track address and the corresponding physical sector address are calculated.

The document control table need not have the record control table 26c. When the table 26c is not used, it suffices to use the control data items stored in the optical disk 20.

Figure 5:
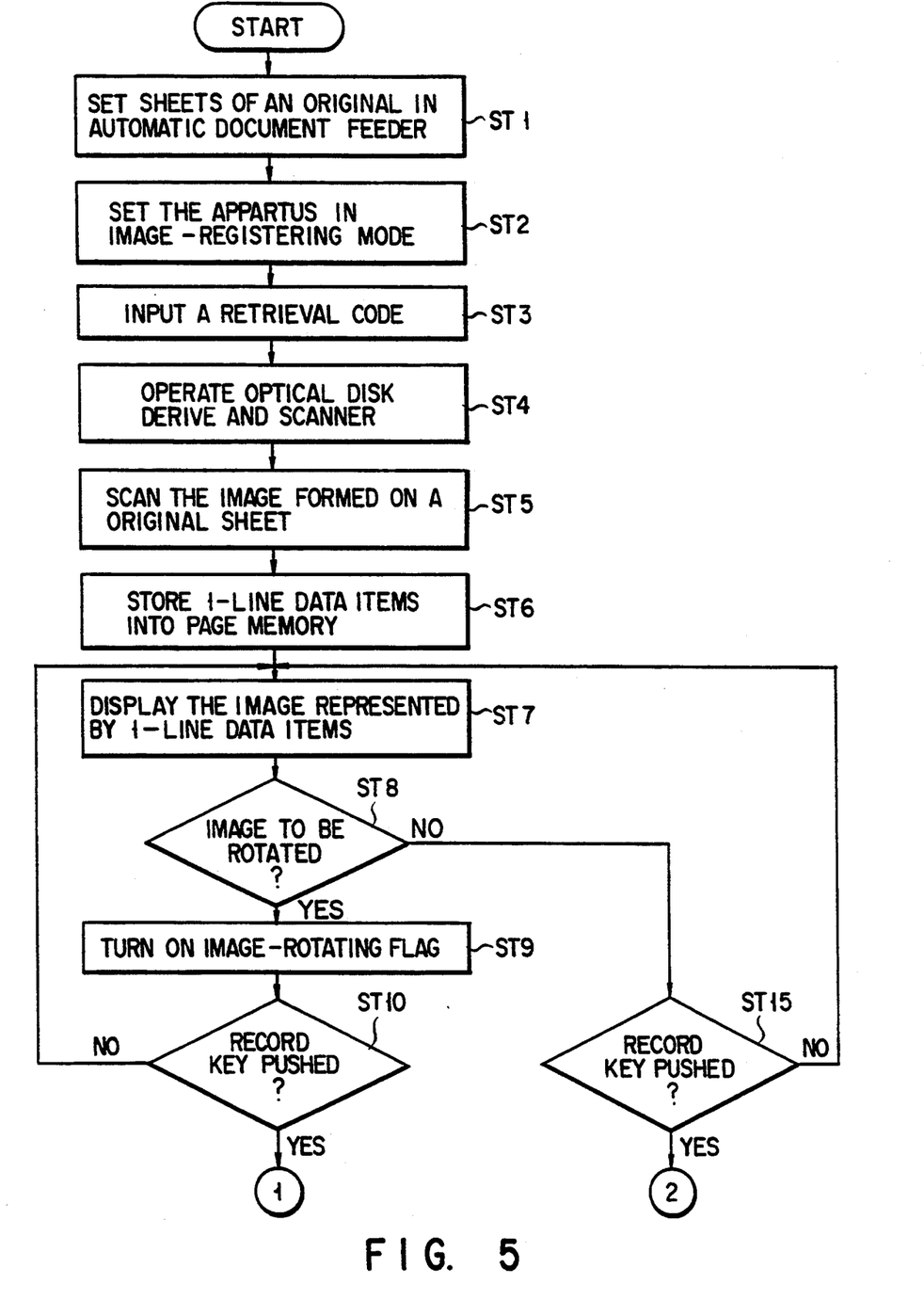
FIGS. 5, 6, and 7 are a flow chart explaining how the apparatus of FIG. 1 registers image data.
Figure 6:
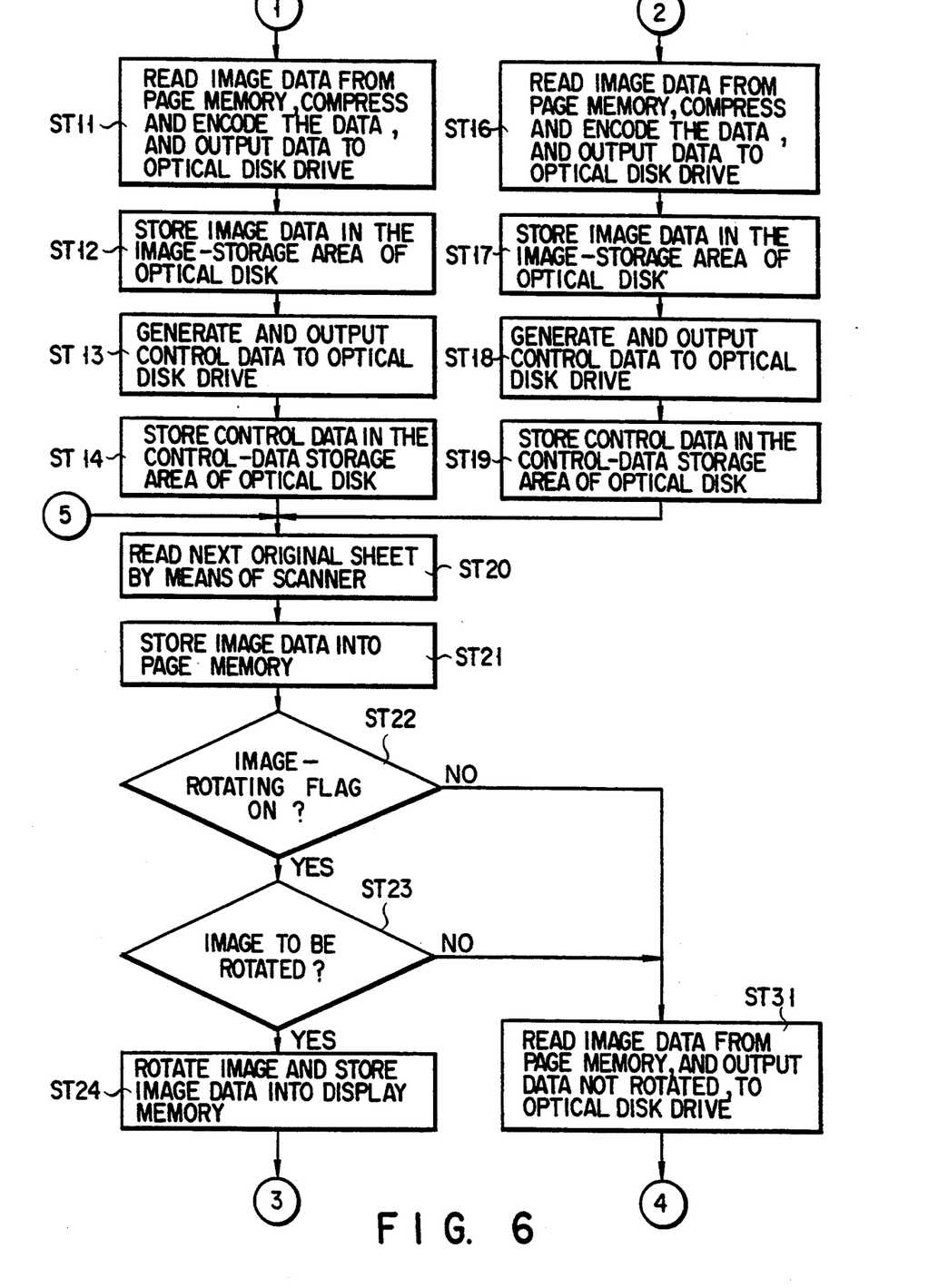
Figure 7:
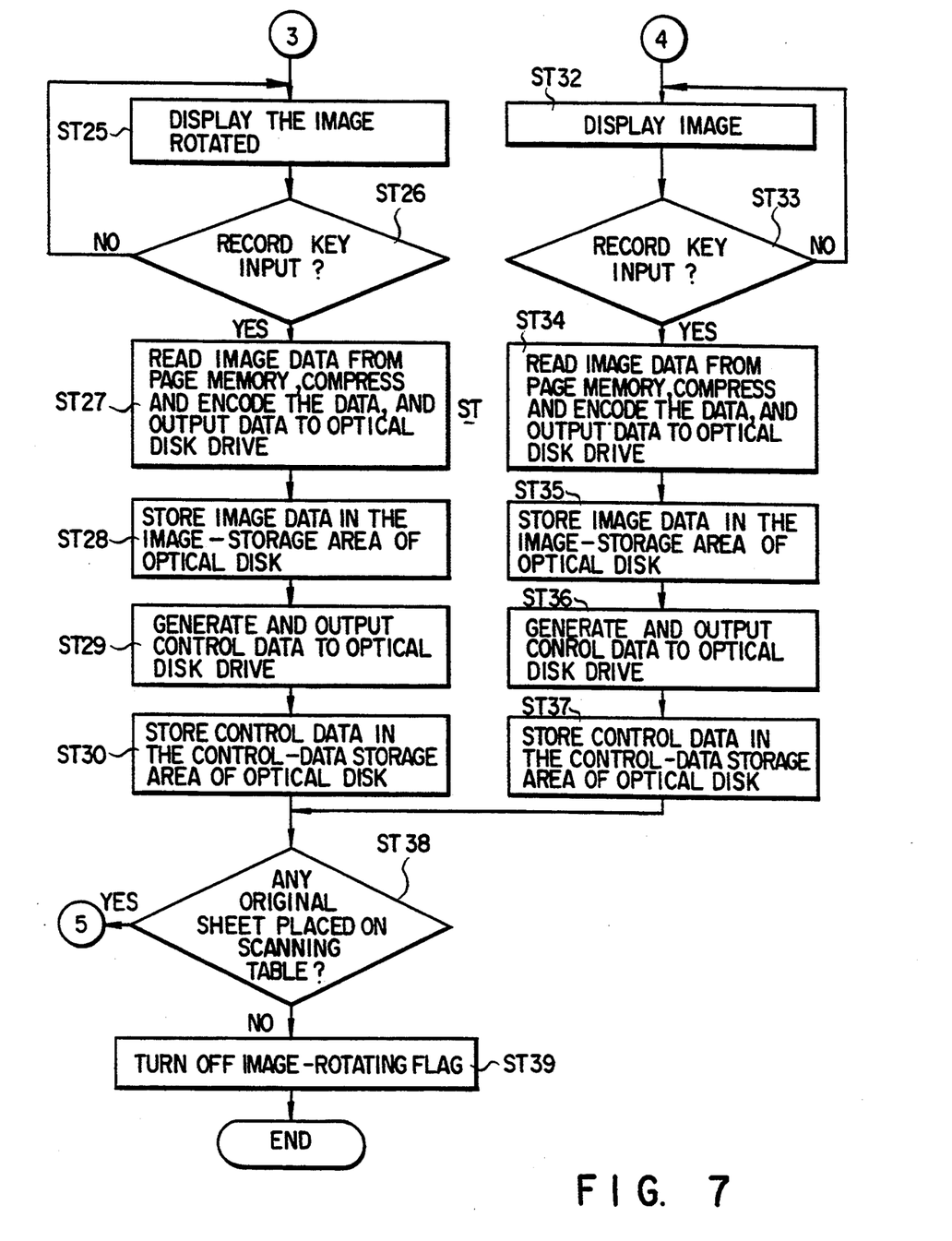

How the electronic filing apparatus (FIG. 1) registers images will now be explained, with reference to the flow chart of FIGS. 5, 6, and 7.

First, in Step ST1, the operator sets sheets of an original in the automatic document feeder 18a of the scanner 18. Next, he or she operates the keyboard 23, to set the apparatus in the image-recording mode in Step ST2, and to input a retrieval code of the image to register, in Step ST3. The retrieval code consists of a plurality of retrieval keys, the contents of which have already been set. The retrieval code is supplied to the CPU 34. The CPU 34 checks the retrieval code against the format prescribed for the code. Also, the CPU 34 compares the input retrieval code with those registered on the optical disk 20 to determine whether or not the input retrieval code has already registered on the optical disk 20. If the input retrieval code is not registered, it is supplied to the memory module 12 and stored into the main memory 38.

Then, in Step ST4, the CPU 34 operates the scanner 18 and the optical disk drive 22. In Step ST5, the scanner 18 performs two-dimensional scanning on the first original sheet supplied by the automatic document feeder 18a onto the scanning table (not shown), generating 1-line data items representing the image formed on the first original sheet.

In Step ST6, the 1-line data items are stored into the page memory 40, one after another. In Step ST7, the CRT display 24 displays the image represented by the 1-line data items stored in the page memory 40.

In Step ST8, the operator determines whether or not the image being displayed by the CRT display 24 is satisfactory in terms of skew, density, resolution and some other features. If he or she finds the image satisfactory, he or she operates the keyboard 23 or the mouse 29, inputting a record key (not shown). Otherwise, he or she does not operate the keyboard 23 or the mouse 29 to input a record key.

Figure 8:
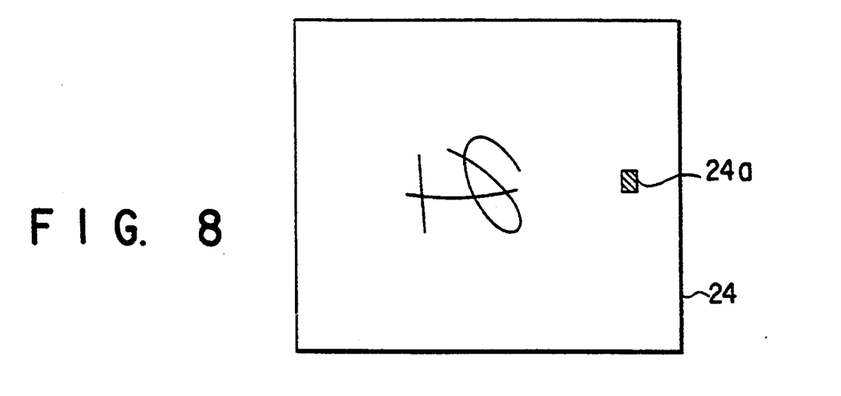
FIG. 8 shows an image displayed by the CRT display incorporated in the apparatus of FIG. 1.

Also in Step ST8, the operator determines whether or not to rotate the image displayed by the CRT display 24. More specifically, if the image assumes such a horizontal position as is shown in FIG. 8 and cannot be well understood, the operator moves the mouse 29, moving the cursor 24a to the right edge of the screen, and then pushes the push button of the mouse 29. As a result, an instruction is generated for instructing that the image be rotated by 90°. This instruction may be generated by moving mouse 29, thus moving the cursor 24a to the left edge of the screen, and then pushes the button of the mouse 29. If the operator finds it unnecessary to rotate the image, he or she moves the mouse 29, moving the cursor 24a to the upper or lower edge of the screen and then pushes the push button.

If Yes in Step ST8, that is, if a record key is input and an instruction for instructing the rotation of the image is generated, the flow goes to Step ST9. In Step ST9, the image-rotating flag stored in the internal memory 34a is turned on. Then, in Step ST10, the CPU 34 determines whether or not a record key has been input in Step ST8. If Yes, the flow goes to Step ST11, and if No, the flow returns to Step ST7.

Figure 9:
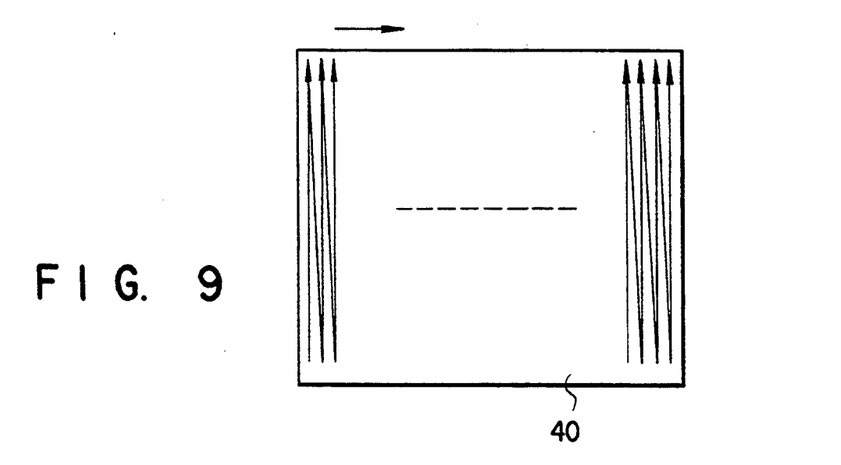
FIG. 9 is a diagram explaining a first method of reading the image data stored in the page memory incorporated in the apparatus of FIG. 1.

In Step ST11, the image data is read from the page memory 40 and supplied to the compression-expansion circuit 50. This image data represents an image which extends in the sub-scanning direction as is illustrated in FIG. 9. The circuit 50 compresses the input data by the MR (Modified Read) method or the like and encodes the data. The image data encoded is supplied to the optical disk drive 22. In Step ST12, the drive 22 stores the encoded image data in the image-data storage area 20b of the optical disk 20.

In Step ST13, the CPU 34 generates and supplies a control data item to the optical disk drive 22. As has been described with reference to FIG. 3, the control data item consists of a record number identifying the image data, the leading one of the addresses at which the data is stored, the length of the data (i.e., number of blocks), the number of pixels arranged in the main-scanning direction, and the number of pixels arranged in the sub-scanning direction. Next, in Step ST14, the control data item is stored into the control-data storage area 20a of the optical disk 20.

If No in Step ST8, that is, if no instruction for rotating the image is made, then the flow goes to step ST15. In Step ST15, the CPU 34 determines whether or not a record key has been input in Step ST8. If Yes, the flow goes to Step ST16, and if No, the flow returns to Step ST7. The Steps ST16 to ST19 are identical to Steps ST11 to ST14.

In Step ST20, when the image data representing the image formed on the first original sheet is thus registered on the optical disk 20, the CPU 34 gives an instruction to the scanner 18. In response to this instruction, the automatic document feeder 18a feeds the second original sheet onto the scanning table, and the scanner 18 starts performing two-dimensional scanning on the second original sheet, generating 1-line data items representing the image formed on the first original sheet.

Next, in Step ST21 the 1-line data items are sequentially stored into the page memory 40. In Step ST22 the CPU 34 determines whether the image-rotating flag stored in the internal memory 34a is on or not. If Yes, the flow goes to Step ST23, in which the CPU 34 compares the number of pixels arranged in the main-scanning direction with that of pixels arranged in the sub-scanning direction, thereby determining whether or not the number of pixels arranged in the main-scanning diction is greater than that of pixels arranged in the sub-scanning direction. Using that determination, CPU34 determines whether or not to rotate the image. If Yes, the flow goes to Step ST24. In Step ST24, the CPU 34 drives the vertical-horizontal conversion circuit 48 to process the 1-line data items now stored in the page memory 40. After circuit 48 processes the 1-line data items, they represent the image rotated by 90°. Then, in Step ST25 the CRT display 45 displays the image formed from the second original sheet thus rotated.

In Step ST26, the operator determines whether or not the image being displayed by the CRT display 24 is satisfactory in terms of skew, density, resolution and some other features. If he or she finds the image satisfactory, he or she operates the keyboard 23 or the mouse 29, inputting a record key (not shown). Otherwise, he or she does not operate the keyboard 23 or the mouse 29 to input a record key.

Also in Step ST26, the operator determines whether or not to rotate the image displayed by the CRT display 24. If the operator finds it unnecessary to rotate the image, he or she moves the mouse 29, moving the cursor 24a to the upper or lower edge of the screen and then pushes the push button. If Yes in Step ST26, the flow goes to Step ST27, and if No, the flow returns to Step ST25.

In Step ST27, the image data is read from the page memory 40 and supplied to the compression-expansion circuit 50. This image data represents an image which extends in the sub-scanning direction as is illustrated in FIG. 9. The circuit 50 compresses the input data and encodes the data. The encoded image data is supplied to the optical disk drive 22. In Step ST28, the drive 22 stores the encoded image data in the image-data storage area 20b of the optical disk 20.

In Step ST29, the CPU 34 generates and supplies a control data item to the optical disk drive 22. The control data item consists of a record number identifying the image data, the leading one of the addresses at which the data is stored, the length of the data (i.e., number of blocks), the number of pixels arranged in the main-scanning direction, and the number of pixels arranged in the sub-scanning direction. Next, in Step ST30, the control data item is stored into the control-data storage area 20a of the optical disk 20.

If No in Step ST22, that is, if the CPU 34 determines that the image-rotating flag stored in the internal memory 34a is off, the flow goes to Step ST31. The flow also goes to step ST31 if No in Step ST23. That is, if the CPU 34 determines that the number of pixels arranged in the main-scanning direction is not greater than that of pixels arranged in the sub-scanning direction thereby finding it unnecessary to rotate the image. In Step ST31, the CPU 34 stores the image data stored in the page memory 40 into the display memory 42. In Step ST32, the CRT display 24 display the image represented by the data stored in the display memory 42.

In Step ST33, the operator determines whether or not the image being displayed by the CRT display 24 is satisfactory in terms of skew, density, resolution and some other features. If he or she finds the image satisfactory, he or she operates the keyboard 23 or the mouse 29, inputting a record key (not shown). Otherwise, he or she does not operate the keyboard 23 or the mouse 29 to input a record key.

Figure 10:
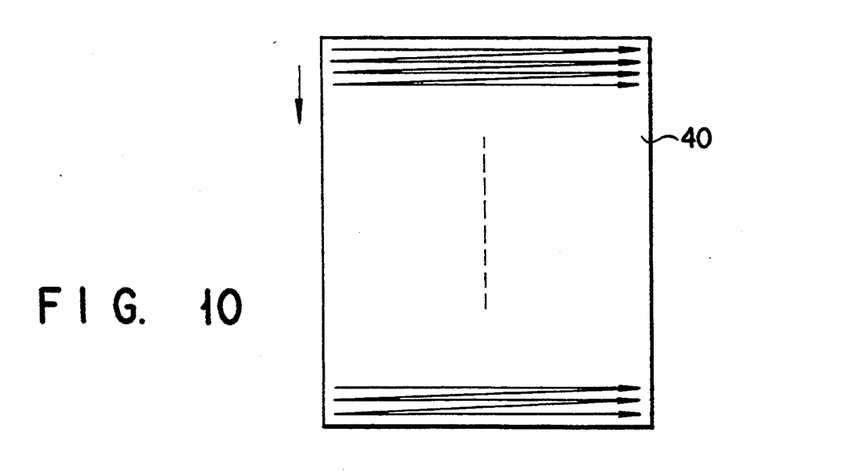
FIG. 10 is a diagram explaining a second another method of reading the image data stored in the page memory.

Also in Step ST33, the operator determines whether or not to rotate the image displayed by the CRT display 24. If the operator finds it unnecessary to rotate the image, he or she reads the image data from the page memory 40 and supplied to the compression-expansion circuit 50 in Step ST34. This image data represents an image which extends in the sub-scanning direction as is illustrated in FIG. 10. Also in Step ST34, the circuit 50 compresses the input data and encodes. The encoded image data encoded is supplied to the optical disk drive 22. In Step ST35, the drive 22 stores the encoded image data in the image-data storage area 20b of the optical disk 20.

In Step ST36, the CPU 34 generates and supplies a control data item to the optical disk drive 22. The control data item consists of a record number identifying the image data, the leading one of the addresses at which the data is stored, the length of the data (i.e., number of blocks), the number of pixels arranged in the main-scanning direction, and the number of pixels arranged in the sub-scanning direction. Next, in Step ST37, the control data item is stored into the control-data storage area 20a of the optical disk 20.

The image data items read from the third original sheet et seq. are registered or stored on the optical disk 20 in Steps ST20 to ST37—in the same method as those read from the first and second original sheets. In Step ST38, the CPU 34 determines whether no original sheet is placed on the scanning table. If Yes, the flow goes to Step ST39, in which the CPU 34 turns off the image-rotating flag, thus ending the image-recording process.

During the image-recording process, the CPU 34 stores various data items about the image data item into the main memory 38 where these data items are associated with the retrieval code (i.e., retrieval data item). These data items are: the physical-track address at which the image data has been stored, the logical address determined by the physical-sector address, the size of the image, the length of the data (i.e., number of blocks), and the attribute of the image. Upon completion of the image-recording process, the CPU 34 supplies the retrieval data items stored in the main memory 38 to the magnetic disk drive 27. The magnetic disk drive 27 stores the retrieval data items in the control tables 26a, 26b, and 26c of the magnetic disk 26.

Any image data item, but the image data item read from the first original sheet, need not be displayed by the CRT display 24 for confirmation. Rather, it can be registered directly on the optical disk 20.

As has been indicated, in order to register the images formed on original sheets, the operator sets the sheets in the automatic document feeder 18a. More precisely, he or she places the sheets such that they extend in the sub-scanning direction of the scanner 18. Thus, the scanner 18 may read the image on each sheet faster than otherwise. The CRT display 24 display the image formed on the first sheet. If the image displayed does not express its significance well to a viewer (see FIG. 8), the mouse 29 is operated to direct the vertical-horizontal conversion circuit 48 to process the data showing this image, thereby rotating the image by 90°. The image data thus obtained is stored or registered on the optical disk 20. The image data read from any original sheet following the first is processed by the conversion circuit 48 into data representing an image rotated by 90°, which is registered on the optical disk 20.

The image on each original sheet can, therefore, be read within a short time, ultimately reducing the time required for recording the image data on the optical disk 20.

It will be described how another electronic filing apparatus according to the invention registers and retrieves image data. It should be noted that this apparatus is similar in structure to the apparatus shown in FIG. 1.

Figure 11:
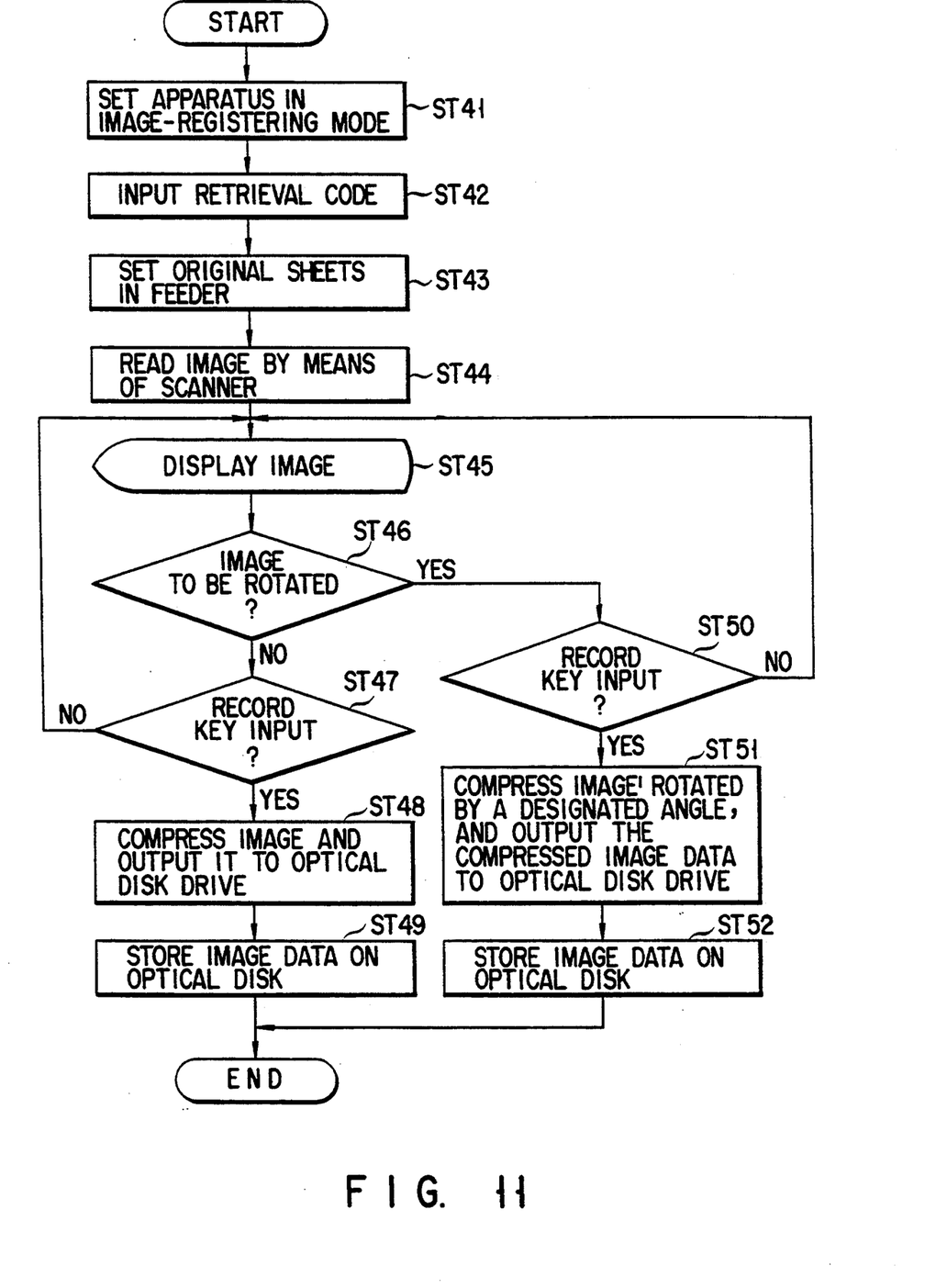
FIG. 11 is a flow chart explaining how an electronic filing apparatus, which is another embodiment of the invention, registers image data.

How this apparatus registers image data will be explained, with reference to the flow chart of FIG. 11.

First, the operator uses the keyboard 23 to set the apparatus in the image-recording mode, in Step ST41. In Step ST42, the operator operates the keyboard 23, thereby inputting a retrieval code for the image data which is to be stored on the optical disk 20. The CPU 34 checks the retrieval code against the format prescribed for the code. Also the CPU 34 compares the input retrieval code with those registered on the optical disk 20, determining whether or not the input retrieval code has already registered on the optical disk 20. If the input retrieval code is not registered, it is supplied to the memory module 12 and stored into the main memory 38.

In Step ST43, the operator sets sheets of an original in the automatic document feeder 18a of the scanner 18 so that the sheets extend in the same direction. For example, the sheets extend in the main-scanning direction or sub-scanning direction of the scanner 18, no matter whether which position expresses the documents each sheet should extend horizontally or vertically to significance better. In Step ST44, the CPU 34 operates the scanner 18 and the optical disk drive 22. The scanner 18 performs two-dimensional scanning on the first original sheet supplied by the automatic document feeder 18a onto the scanning table, generating 1-line data items representing the image formed on the first original sheet.

In Step ST45, the 1-line data items are stored into the page memory 40, one after another, and the CRT display 24 displays the image represented by the 1-line data items stored in the page memory 40. The operator determines whether or not the image being displayed by the CRT display 24 is satisfactory in terms of skew, density, resolution and some other features. If he or she finds the image satisfactory, he or she operates the keyboard 23 or the mouse 29, inputting a record key (not shown). Otherwise, he or she does not operate the keyboard 23 or the mouse 29 to input a record key.

Figure 12:
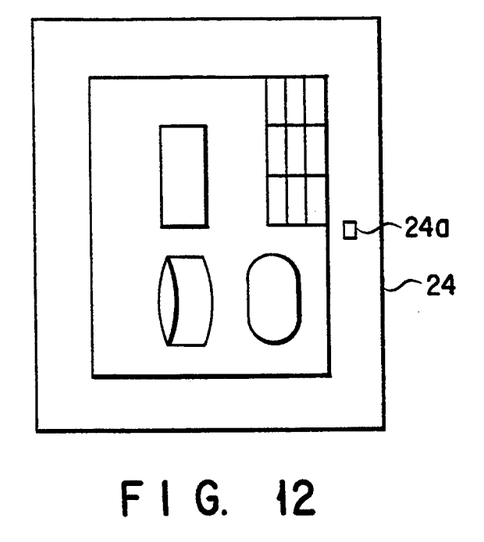
FIG. 12 shows an image displayed by the CRT display incorporated in the apparatus of FIG. 1.

Also in Step ST46, the operator determines whether or not to rotate the image displayed by the CRT display 24. More specifically, if the image assumes a vertical position as is shown in FIG. 12 and is unable to be understood well, the operator moves the cursor 24a to the right edge of the screen with the mouse 29, and then pushes the push button of the mouse 29. As a result, an instruction is generated for instructing that the image be rotated by 90°. If the operator finds it unnecessary to rotate the image, he or she moves the mouse 29, moving the cursor 24a to the upper or lower edge of the screen and then pushes the push button.

Figure 13:
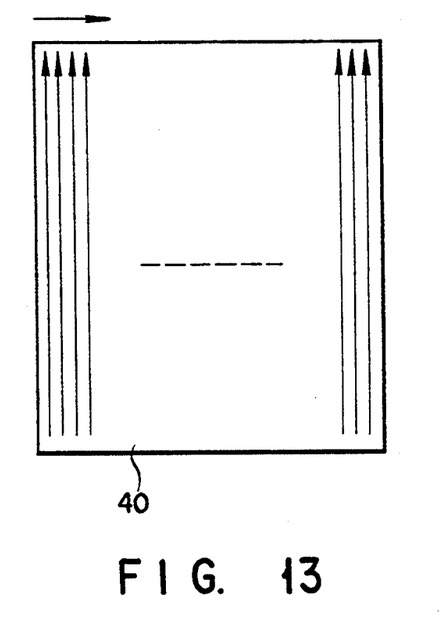
FIG. 13 is a diagram explaining a third method of reading the image data stored in the page memory.

Then, in Step ST47, the CPU 34 determines whether or not a record key has been input. If Yes, the flow goes to Step ST48, in which the CPU 34 reads the image data stored in the page memory 40 and supplies this data to the compression-expansion circuit 50. This image data represents an image which extends in the main-scanning direction, as illustrated in FIG. 13. The circuit 50 compresses the input data and encodes the data. The encoded image data is supplied to the optical disk drive 22. In Step ST49, the drive 22 stores the encoded image data in the image-data storage area 20b of the optical disk 20.

Also in Step ST49, the CPU 34 generates and supplies a control data item to the optical disk drive 22. As has been described with reference to FIG. 3, the control data item consists of a record number identifying the image data, the leading one of the addresses at which the data is stored, the length of the data (i.e., number of blocks), the number of pixels arranged in the main-scanning direction, and the number of pixels arranged in the sub-scanning direction. The control data item is stored into the control-data storage area 20a of the optical disk 20.

If No in Step ST46, that is, if no instruction for rotating the image is made, then the flow goes to step ST50. In Step ST50, the CPU 34 determines whether or not a record key has been input in Step ST46. If Yes, the flow goes to Step ST51, and if No, the flow returns to Step ST45. In Step ST51, the CPU 34 reads the image data stored in the page memory 40 and supplies this data to the compression-expansion circuit 50. This image data represents an image rotated by the designated angle and extending in the sub-scanning direction, as illustrated in FIG. 10. The circuit 50 compresses the input data and encodes the data. The encoded image data is supplied to the optical disk drive 22. In Step ST52, the drive 22 stores the encoded image data in the image-data storage area 20b of the optical disk 20.

Also in Step ST52, the CPU 34 generates and supplies a control data item to the optical disk drive 22. As has been described, the control data item consists of a record number identifying the image data, the leading one of the addresses at which the data is stored, the length of the data (i.e., number of blocks), the number of pixels arranged in the main-scanning direction, and the number of pixels arranged in the sub-scanning direction. The control data item is stored into the control-data storage area 20a of the optical disk 20.

During the image-recording process, the CPU 34 stores various data items corresponding to the image data item into the main memory 38, where those data items are associated with the retrieval code (i.e., retrieval data item). These data items are: the physical-track address at which the image data has been stored, the logical address determined by the physical-sector address, the size of the image, the length of the data (i.e., number of blocks), and the attribute of the image. Upon completion of the image-recording process, the CPU 34 supplies the retrieval data items stored in the main memory 38 to the magnetic disk drive 27. The magnetic disk drive 27 stores the retrieval data items in the control tables 26a, 26b, and 26c of the magnetic disk 26.

Hence, any data item representing an image which extends horizontally, and which cannot be well understood, is processed by the vertical-horizontal conversion circuit 48 into a data item representing an identical image which is rotated by 90°. Thus vertically extending data item, thus obtained, is stored on the optical disk 20. Similarly, any data item representing an image which extends vertically, and which cannot be clearly understood, is processed into a data item representing an identical image rotated by 90°. The horizontally extending data item, thus obtained, is stored on the optical disk 20.

Figure 14:
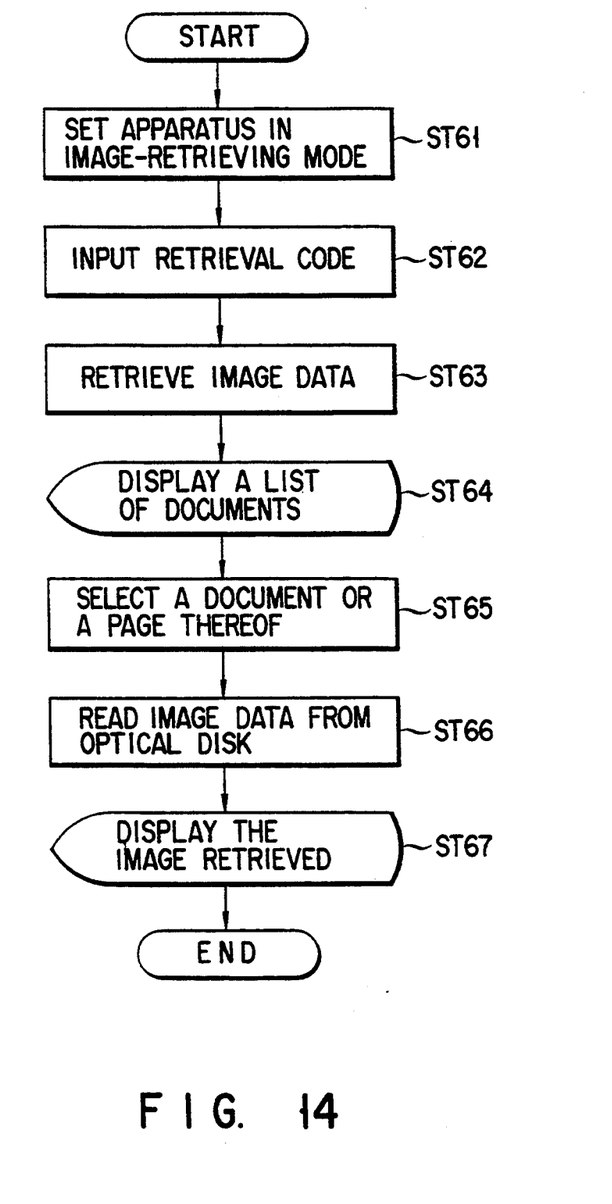
FIG. 14 is a flow chart explaining how the second embodiment of the invention retrieves the image data.

How the electronic filing apparatus according to the second embodiment of the invention retrieves any desired data item from the optical disk 20 will be explained, with reference to the flow chart of FIG. 14.

First, the operator operates the keyboard 23, setting the apparatus in the image-retrieving mode, in Step ST61. In Step ST62, the operator uses the keyboard 23 to input a retrieval code corresponding to the image data he or she wishes to retrieve from the optical disk 20. In Step ST63, the CPU 34 compares the retrieval code with those registered in the title-control table 26a (FIG. 4) of the magnetic disk 26, determining whether or not the input retrieval code has already registered on the optical disk 20. If the input retrieval code is registered, the CPU 34 extracts the document number assigned to the image data to be retrieved from the optical disk 20 and stores the document number into the main memory 38.

In Step ST64, the CPU 34 refers to the document number stored in the main memory 38 and prepares a list of documents from the data read from the title-control table 26a of the magnetic disk 26. The list of documents is displayed by the CRT display 24. The operator checks the document list to see if the list contains the document (i.e., page) which he or she wants to retrieve from the optical disk 20. If the operator does not find the desired document in the list, the operator inputs the retrieval code again by operating the keyboard 23. If the operator finds the desired document in the list, the flow goes to Step ST65. In Step ST65, the operator operates the keyboard 23, inputting a document number and a page number and, thereby, selecting the image data item which he or she wishes to retrieve from the optical disk 20.

The CPU 34 refers to the record number corresponding to the selected image data item and recorded in the page-control table 26b of the magnetic disk 26. The CPU 34 then reads the logical address corresponding to the record number, from the record-control table 26c of the optical disk 26. The CPU 34 calculates the physical-track address and the physical-sector address, both corresponding to the logical address. Using the track address and the sector address, the optical disk drive 22 reproduces the image data from the image-data storage area 20b of the optical disk 20. Note that the image data is reproduced in units of compressed 1-line data items. Also, the optical disk drive 22 reproduces from the the control-data storage area 20a the number of pixels arranged in the main-scanning direction and the number of pixels arranged in the sub-scanning direction. The 1-line data items and the numbers of pixels, thus reproduced, are supplied from the disk drive 22 to the CPU 34.

In Step ST66, the CPU 34 supplies the 1-line data items (i.e., the compressed image data), one after another, to the compression-expansion circuit 50. The circuit 50 expands the 1-line data items. The image data comprised of the expanded 1-line data items is stored in a storage area of the page memory 40, where that storage area is determined by the number of pixels arranged in the main-scanning direction and the number of pixels arranged in the sub-scanning direction. This image data is processed by the image-enlarging/reducing circuit 46 into image data representing a reduced image, which is stored in the display memory 42. The image data stored in the display memory 42 is supplied to the CRT display 24. In Step ST67, the CRT display 24 displays the reduced image.

As has been described in the image storing-recording apparatus, any data item representing an image not positioned for clear understanding is processed to represent an identical but rotated image which can be understood more clearly. The data image, thus processed, is stored on the optical disk, and retrieval data corresponding to image data item is stored on the optical disk, along with number of pixels arranged in the main-scanning direction and the number of pixels arranged in the sub-scanning direction. Any data item can also be retrieved from the optical disk without being processed to represent a rotated image. The image data retrieved is expanded in accordance with the number of pixels arranged in the main-scanning direction, and the number of pixel arranged in the sub-scanning direction.

Since any data item retrieved represents an image which can be understood clearly, whether positioned vertically or horizontally, it need not be processed to represent a rotated image. This helps to minimize the time required for retrieving image data.

With the electronic filing apparatus it is possible to sequentially retrieve display image data items from the optical disk, and to sequentially display them by the CRT display, as if turning pages of a book. In this case, the image-retrieving process can also be performed within a short period of time.

As has been described, the retrieval data recorded in association with the image data stored on the optical disk includes no data item indicating the position of the image represented by the image data. Rather, the image data includes an item representing the position of the data. Therefore, the software configuration employed in the apparatus need not be a special one, and the data accumulated by the apparatus can be directly used in an electronic filing apparatus of a different type.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image recording apparatus for recording an image on a recording medium, said apparatus comprising:
   original-feeding means for sequentially feeding a plurality of original sheets, each having an image;
   original-reading means for scanning each of the plurality of original sheets fed by said original-feeding means, thereby reading an image from each of the plurality of original sheets;
   display means for displaying the image read by said original-reading means from a first sheet of the plurality of original sheets;
   instruction means for generating an instruction indicating whether the image read from the first sheet which is displayed by said display means will be rotated;
   instruction memory means for storing the instruction generated by said instruction means;
   image-rotating means for rotating the image read from the first original sheet based on the instruction generated by said instruction means;
   image-recording means for recording the image rotated by said image-rotating means on the recording medium;
   image-processing means for causing said image-rotating means to rotate images which are read after the image corresponding to the first original sheet has been read by said original-reading means when said instruction stored in said memory means indicates that the first image has been rotated, and for causing said image-recording means to record the image on said recording medium.

2. The image recording apparatus according to claim 1, wherein said display means has a screen with a left edge, a right edge, an upper edge and a lower edge, and said instruction means generates an instruction for rotating the image to be displayed when a cursor on the screen of said display means is moved to the left or right edge of the screen, and generates an instruction for prohibiting the display of the image when the cursor is moved to the upper or lower edge of the screen, each of said cursor movements being performed via a mouse.

3. The image recording apparatus according to claim 1, wherein said original-reading means reads an image from each original sheet and generates data representing an image extending in the main-scanning direction.

4. An image recording apparatus for recording an image on a recording medium, comprising:

original-feeding means for sequentially feeding a plurality of original sheets, each having an image;

original-reading means for scanning each of the plurality of original sheets fed by said original-feeding means in a main-scanning direction and a sub-scanning direction to read the image from each of the plurality of original sheets, the image having a number of pixels arranged in the main-scanning direction and a number of pixels arranged in the sub-scanning direction;

display means for displaying the image read by said original-reading means from a first sheet of the plurality of original sheets;

instruction means for generating an instruction indicating whether the image read from the first sheet which is displayed by said displayed means will be rotated;

instruction memory means for storing the instruction generating by said instruction means;

image-rotating means for rotating the image read from the first original sheet based on the instruction generated by said instruction means;

image-recording means for recording the image rotated by said image-rotating means on the recording medium;

decision-making means for determining whether the image read from the first original sheet has been rotated in accordance with contents of said instruction memory means, said determination being made every time said original-reading means reads the image formed on an original sheet following the first original sheet, and for determining whether to rotate the image read from each original sheet following the first original sheet by comparing the number of pixels in the main-scanning direction with the number of pixels in the sub-scanning direction on the image read from the original sheet following the first original sheet when said first decision-making means determines that the image read from the first original sheet has been rotated; and image-processing means for causing said image-rotating means to rotate the image read by said original-reading means when the instruction stored in said instruction memory means indicates that the image from the first original sheet which is displayed by said display means is rotated by said image-rotating means, and for causing said image-recording means to record the image on said recording medium.

5. The image recording apparatus according to claim 4, wherein said second decision-making means determines that image read from the original sheet following the first original sheet should be rotated, when the number of pixels arranged in the main-scanning direction is greater than the number of pixels arranged in the sub-scanning direction.

* * * * *